(12) United States Patent
Esslinger

(10) Patent No.: US 8,151,672 B2
(45) Date of Patent: Apr. 10, 2012

(54) GROOVE CUTTING ASSEMBLY

(76) Inventor: Thomas Esslinger, Langdon, NH (US)

( * ) Notice: Subject to any disclaimer, the term of this patent is extended or adjusted under 35 U.S.C. 154(b) by 431 days.

(21) Appl. No.: 12/464,393

(22) Filed: May 12, 2009

(65) Prior Publication Data
US 2009/0277316 A1    Nov. 12, 2009

Related U.S. Application Data

(60) Provisional application No. 61/052,380, filed on May 12, 2008.

(51) Int. Cl.
  *B23B 29/00* (2006.01)
  *B23B 29/12* (2006.01)
(52) U.S. Cl. .............................. 82/1.11; 407/8
(58) Field of Classification Search .............. 407/8, 9, 407/10; 408/147, 153, 173; 82/1.1, 161, 82/173
See application file for complete search history.

(56) References Cited

U.S. PATENT DOCUMENTS

| | | | |
|---|---|---|---|
| 1,415,578 A * | 5/1922 | Knoop | 407/9 |
| 2,945,404 A * | 7/1960 | Baumstark, Jr. et al. | 82/1.2 |
| 3,142,215 A * | 7/1964 | Mancuso | 82/158 |
| 3,427,904 A * | 2/1969 | Arendt | 408/239 R |
| 3,499,352 A * | 3/1970 | Milewski et al. | 408/173 |
| 3,667,856 A * | 6/1972 | Walker | 408/158 |
| 3,668,954 A * | 6/1972 | Brown, II | 82/158 |
| 3,724,965 A * | 4/1973 | Green | 408/183 |
| 4,428,704 A * | 1/1984 | Kalokhe | 408/156 |
| 4,878,787 A * | 11/1989 | Hunt | 408/181 |

* cited by examiner

*Primary Examiner* — Will Fridie, Jr.
(74) *Attorney, Agent, or Firm* — Davis & Bujold, P.L.L.C.

(57) ABSTRACT

A groove cutting assembly comprising a cutter housing, a cutter assembly with a cutting edge, and the cutter assembly being accommodated by the cutter housing, and a drive mechanism, coupled to the cutter assembly, for indexing the cutter assembly one of radially inward and radially outward relative to the cutter housing upon rotation of the cutter assembly past an indexing member. The drive mechanism comprises a barrel assembly, engaged with the cutter assembly, and a feed member which threadedly engages with the barrel assembly. Rotation of the feed member, in a first rotational direction, indexes the cutter assembly radially outwardly away from the cutter housing, while rotation of the feed member, in an opposite rotational direction, indexes the cutter assembly radially inwardly toward the cutter housing.

20 Claims, 9 Drawing Sheets

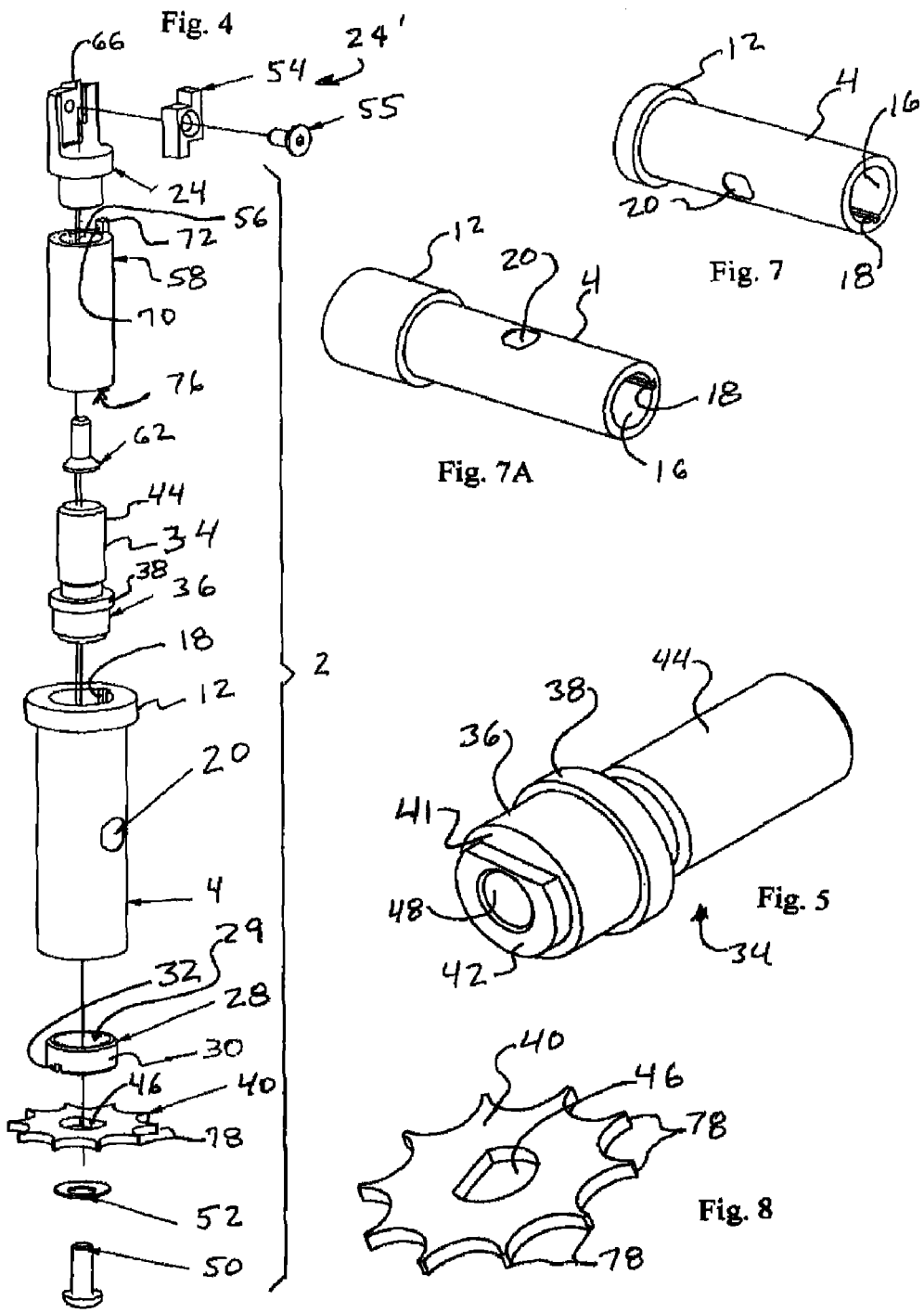

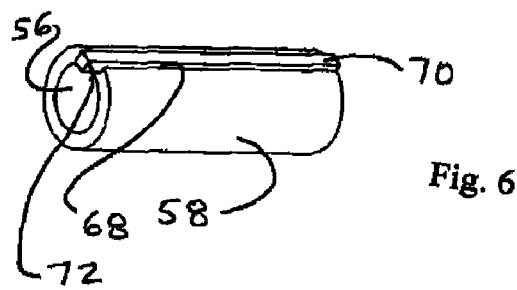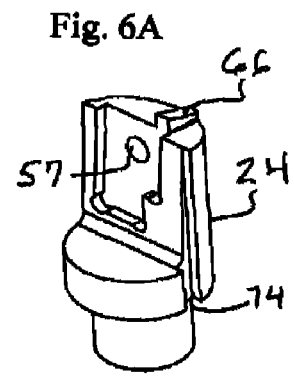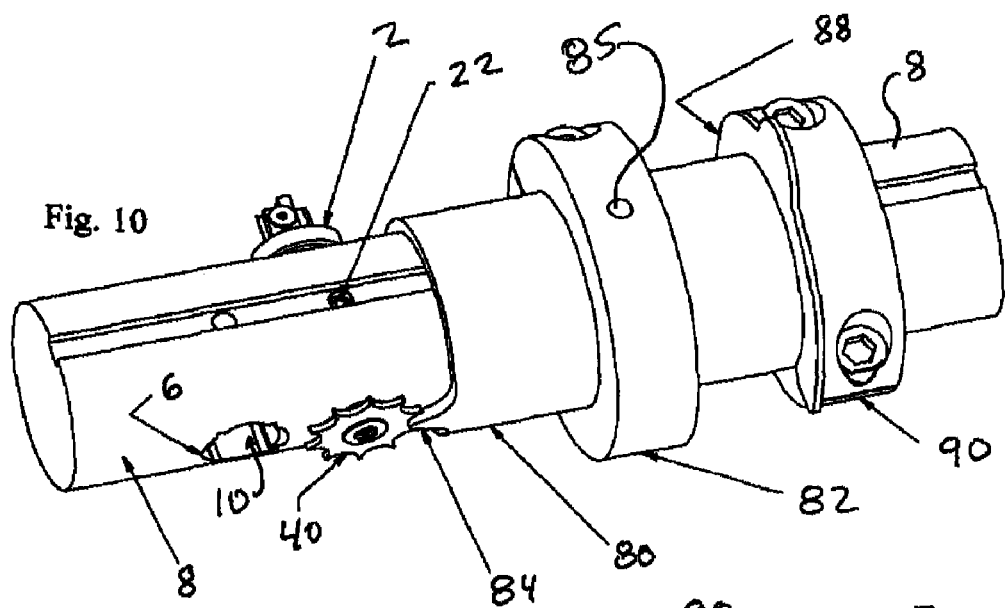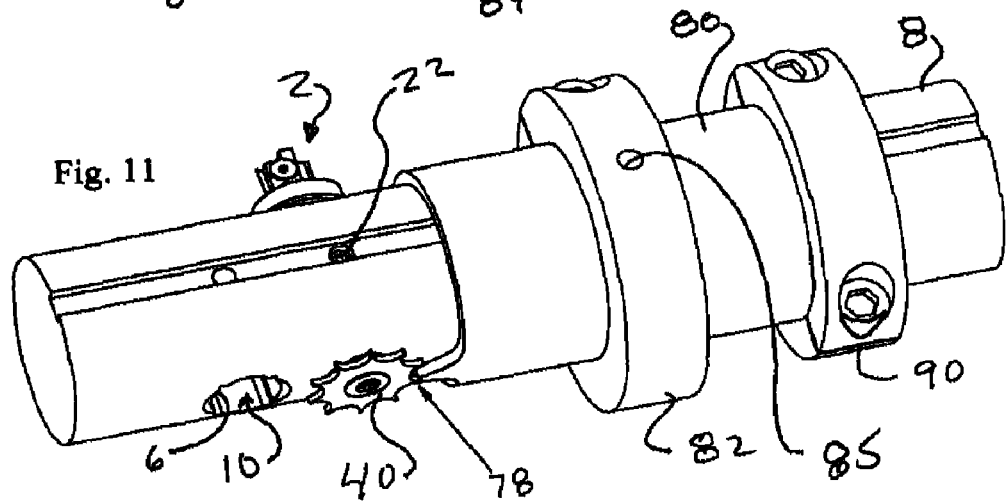

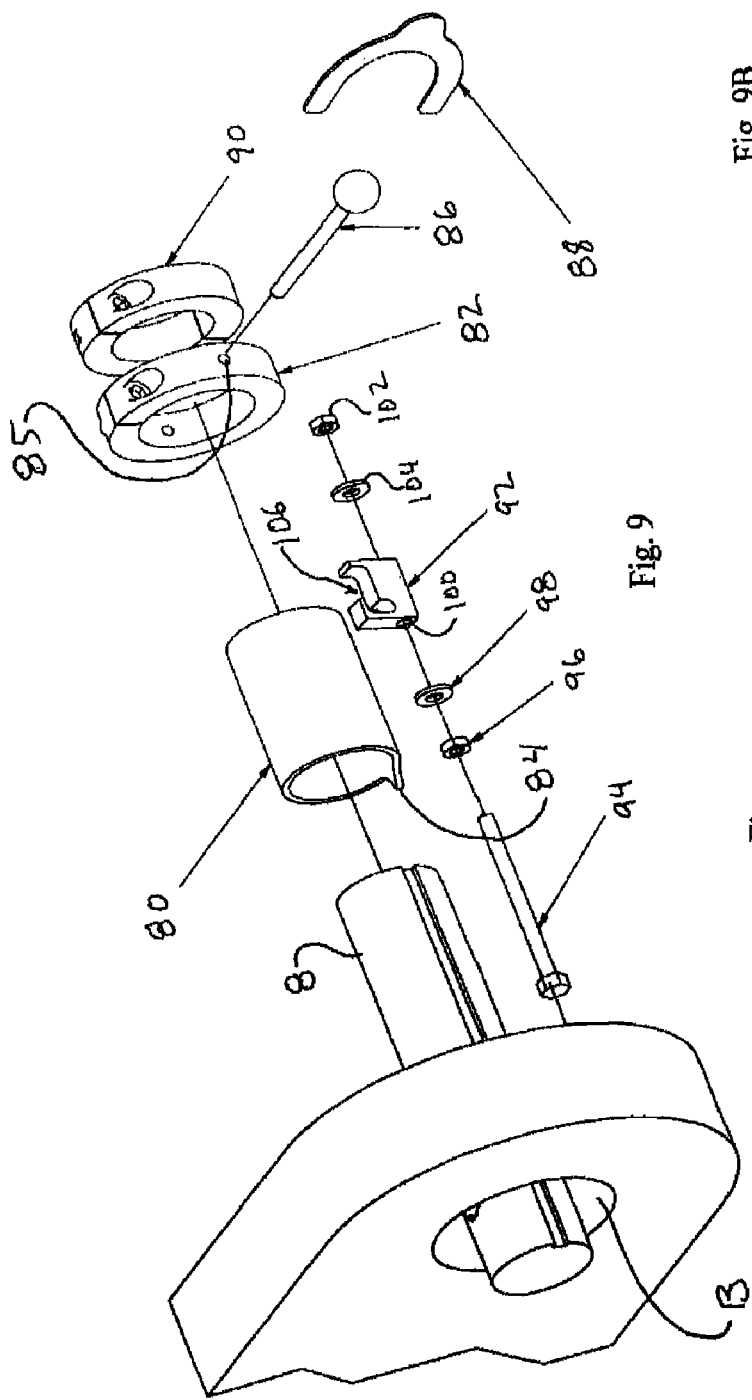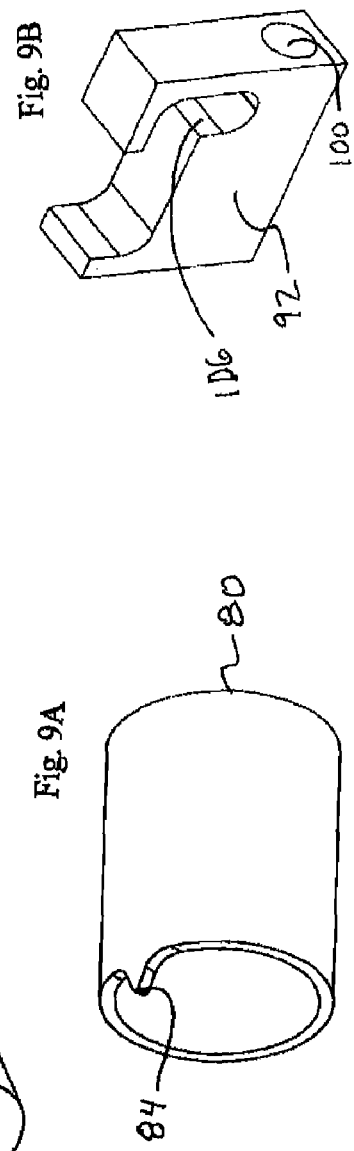
Fig. 9
Fig. 9A
Fig. 9B

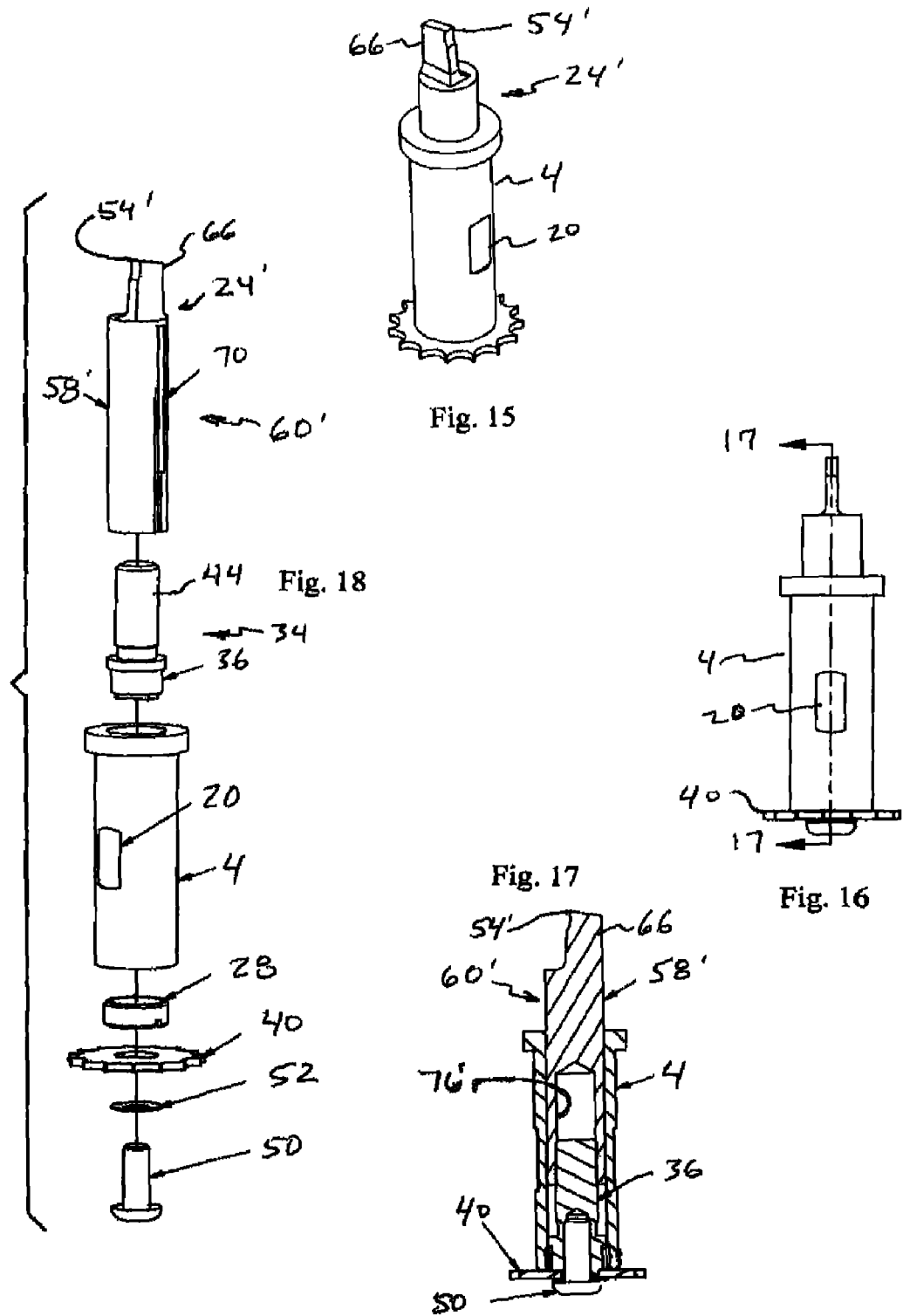

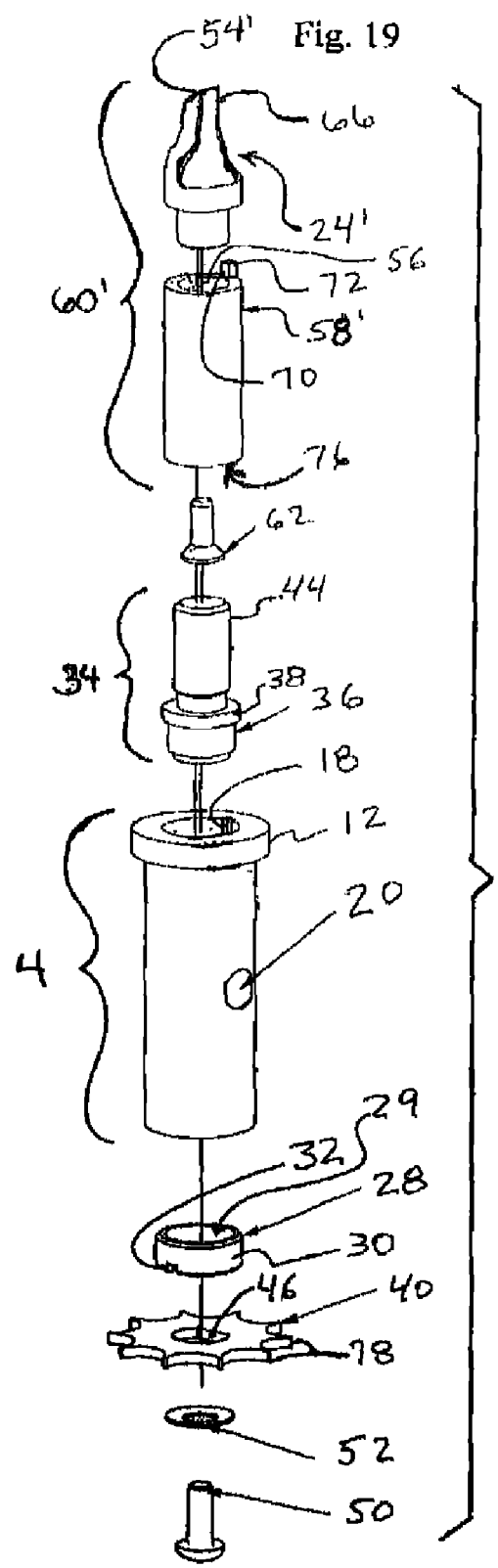

GROOVE CUTTING ASSEMBLY

FIELD OF THE INVENTION

The present invention relates to a portable rotatable groove cutting device for forming an annular groove within a bore. The rotatable groove cutting device may, for example, be supported by a boring bar which is rotated by a portable boring machine during machining of a bore.

BACKGROUND OF THE INVENTION

Heavy machinery and equipment frequently require repair and it is generally preferable that such repair be done in the "field" rather than transporting the machinery or equipment to a suitable repair facility as this reduces the associated time and costs required for such repair. One of the most commonly required repairs for large machinery or equipment is the repair of a bore, that is, a circular opening that supports an axle or shaft, for example, which becomes damaged or excessively worn due to a variety of different reasons or causes. Alternatively, it may be desired to machine a bore out to a slightly larger diameter for a variety of different reasons. In many repair applications, it is also necessary to form an annular groove or recess, within the bore being repaired, to accommodate a C-clip, a retaining ring, or some other stop member or element.

The repair of a damaged or worn bore typically involves rebuilding the interior surface of the bore by deposition of a metal, typically by a welding or a flame deposition process, followed by the subsequent machining and boring of the rebuilt or refabricated bore to the a precisely required diameter. The rebuilding and machining operations are typically performed in the field by means of a portable boring machine which has a boring bar that is inserted into the bore. The boring bar is typically supported on bearings, on each side of the bore, and may be fitted with a variety of tools for repairing the bore, such as a welding head and a variety of cutting or machining tools, such as a rotatable groove cutting tool or assembly.

A conventional boring bar, along with its associated boring bar bearings supported at each end of the bore, provides the radial support and rigidity for the welding head and/or the tools that are necessary for the accurate reconstruction of a bore, but also presents other problems and shortcomings.

While conventional boring tools, used in combination with the boring bar, are adequate for machining the interior surface of bore to a desired constant diameter, such conventional tools are unable to reliably and accurately form an annular groove within the bore for accommodating, for example, a C-clip, a retaining ring, or some other stop member or element within the bore being repaired. In addition, such conventional tools do not permit indexing a machining or cutting tool, either radially inward to a smaller radius or radially outward to a larger radius, while the boring bar is rotating and/or indexing the machining or cutting tool a desired radial distance following each complete rotation of the boring bar.

SUMMARY OF THE INVENTION

Wherefore, it is an object of the present invention to address and overcome the above mentioned shortcomings and drawbacks associated with the prior art.

Another object of the present invention is to provide an inexpensive but reliable groove cutting assembly which easily and accurately forms an annular groove within the surface of the bore being repaired.

A further object of the present invention is to provide a groove cutting assembly with a bit head which can be indexed, either radially inwardly or radially outwardly, a desired distance, e.g., from about 0.0005 to about 0.010 inches or so (0.01 to 0.2 millimeters), following each complete rotation of the boring bar.

Still another object of the present invention is to provide a groove cutting head which has an easily replaceable groove cutting bit so that a variety of grooves with different shapes, sizes and widths can be formed, within the surface of the bore being repaired, by merely changing the groove cutting bit.

Yet another object of the present invention is to provide a groove cutting assembly which can be quickly and reliably retracted, once the desired groove of a desired depth is formed in the surface of the bore being repaired, to facilitate ease of removal of the groove cutting assembly from the bore being repaired.

The present invention also relates a groove cuffing assembly comprising: a cutter housing; a bit holder accommodated by the cutter housing; a cutting bit supported by the bit holder; a drive member; and a drive mechanism, coupled to the drive member, for indexing the bit holder one of radially inward and radially outward relative to the cutter housing upon rotation of the drive member past an indexing member.

The present invention also relates to a groove machining combination comprising a groove cutting assembly and a boring bar, the boring bar having at least one tool holder and a set screw is provided for securing the groove cutting assembly when supported by the tool holder, and a stationary indexing member, and the groove cutting assembly comprising: a cutter housing; a bit holder accommodated by the cutter housing; a cutting bit supported by the bit holder; a drive member; and a drive mechanism, coupled to the drive member, for indexing the bit holder one of radially inward and radially outward relative to the cutter housing upon rotation of the drive member by the indexing member as the boring bar rotates the groove cutting assembly past the stationary indexing member.

The present invention further relates to a method of forming a groove in a surface of a bore being repaired via a groove cutting assembly supported by a tool holder of a boring bar, and a stationary indexing member for indexing the groove cutting assembly, wherein the groove cutting assembly comprises a cutter housing; a bit holder accommodated by the cutter housing; a cutting bit supported by the bit holder; a drive member; and a drive mechanism, coupled to the drive member, for indexing the bit holder one of radially inward and radially outward relative to the cutter housing; and the method comprising the steps of: locating the groove cutting assembly in a bore; rotating the boring bar and the groove cutting assembly in a first rotational direction; and indexing, via the stationary indexing member, the drive member of the groove cutting assembly each time the groove cutting assembly rotates past the stationary indexing member to machine the groove in the bore being repaired.

BRIEF DESCRIPTION OF THE DRAWINGS

The present invention will now be described by way of example with reference to the accompanying drawings, in which:

FIG. 4 diagrammatic exploded view of FIG. 1 showing the various components comprising the groove cutting assembly;

FIG. 5 is a diagrammatic bottom perspective view of the feed member;

FIG. 6 is a diagrammatic perspective view of the barrel assembly;

FIG. 6A is a diagrammatic perspective view of the bit holder;

FIG. 7 is a diagrammatic perspective view of the cutter housing;

FIG. 7A is a diagrammatic perspective view of a second embodiment of the cutter housing for a larger diameter bore to be repaired;

FIG. 8 is a diagrammatic perspective view of the gear wheel;

FIG. 9 is a diagrammatic exploded view showing the various components to be supported by a boring bar along with the groove cutting assembly;

FIG. 9A is a diagrammatic perspective view of a rotational sleeve;

FIG. 9B is a diagrammatic perspective view of a retainer;

FIG. 10 is a diagrammatic perspective view showing the groove cutting assembly, within a tool hole of a boring bar, and assembly of the various components, including a spacer, on the boring bar;

FIG. 11 is a diagrammatic perspective view showing the groove cutting assembly installed within the tool hole of the boring bar, following removal of the spacer;

FIG. 15 is a diagrammatic perspective view of an alternative arrangement of the groove cutting assembly according to the present invention;

FIG. 16 is a diagrammatic front elevational view of FIG. 15;

FIG. 17 is a diagrammatic cross sectional view along section line 17-17 of FIG. 16;

FIG. 18 diagrammatic exploded view of FIG. 15 showing the various components comprising the groove cutting assembly; and FIG. 19 diagrammatic exploded view of another alternative arrangement of the groove cutting assembly.

DETAILED DESCRIPTION OF THE INVENTION

Figure 1:
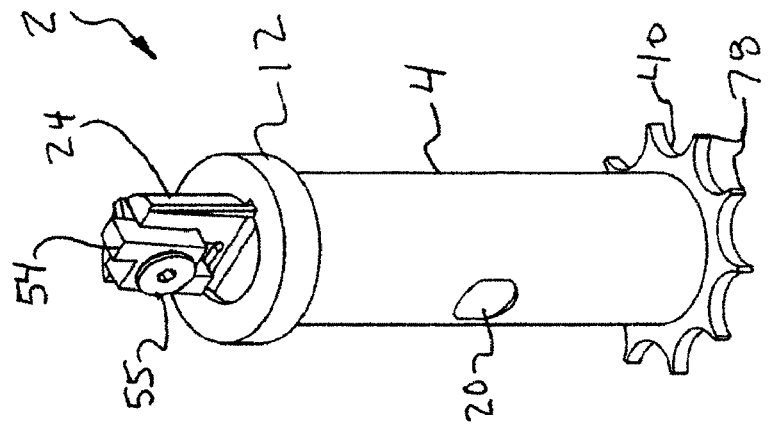
FIG. 1 is a diagrammatic perspective view of the groove cutting assembly according to the present invention.

With reference now to FIGS. 1-8, a detailed description concerning the various elements comprising the groove cutting assembly 2 of the present invention will now be described. As can be seen these Figures, the groove cutting assembly 2 generally comprises a cylindrical cutter housing 4, sized to be captively received within a tool holder 6 of a boring bar 8, for example. The tool holder 6 is open at both a first end and an opposed second end thereof with a through bore 10 extending completely through the boring bar 8. The cutter housing 4 has a larger diameter annular collar 12 which abuts against an exterior surface of a boring bar 8, or some other support member, to prevent further insertion of the groove cutting assembly 2 within the tool holder 6. As shown in FIG. 7A, this embodiment of the annular collar 12 has a longer axial length than the annular collar 12 of the embodiment of FIG. 7, and the cutter housing 4 of FIG. 7A is generally employed for larger diameter bores to be repaired 14, i.e., to space the cutting bit further radially away from the cutter housing 4. The larger axial length for the annular collar 12 provides addition support for the groove cutting assembly 2 during use.

The interior surface 16 of the cutter housing 4 includes an elongate longitudinal keyway 18 which runs along the entire length of the interior surface of the cutter housing 4, from a first top end to an opposed second bottom end. At least one, and more preferably, a pair of opposed set screw flats 20 are formed in a central region of the exterior surface of the cutter housing 4 with the set screw flats 20 preferably being located 180 degrees apart from one another. The purpose of set screw flats 20 is to facilitate securely holding and retaining the groove cutting assembly 2, within the tool holder 6 of the boring bar 8, once a set screw 22 is sufficiently tightened. By having a pair of set screw flats 20 located 180 degrees apart from one another, this facilitates orientating the groove cutting assembly 2 in a desired cutting orientation, depending upon the rotational direction of the boring bar 8, so that the groove cutting assembly 2 can cut or machined, in either rotational direction of the boring bar 8, by merely rotating the groove cutting assembly 2 180 degrees within the tool holder 6. Alternatively or in addition, a bit holder 24 can be rotatable by 180 degrees to assist with orientating the groove cutting assembly 2 in a desired cutting orientation.

A through bore extends through the cutter housing 4 and an interior surface of the cutter housing 4, adjacent the second bottom end thereof, has an internal thread 26 and a stop member 28, which has a mating exterior thread 30, threadedly engages with the interior thread 26 of the cutter housing 4. To facilitate such threaded engagement of the stop member 28 with the cutter housing 4, a pair of opposed notches 32 are provided in a trailing first end surface of the stop member 28 so as to permit a conventional screw driver to engage and thread the stop member 28 into the second bottom end of the cutter housing 4 to a desired location. To retain permanent engagement, between the stop member 28 and the cutter housing 4, one or both of those threaded surfaces 26, 30 is coated with an adhesive, such as "Lock-Tite®," which securely fastens those two components with one another, once the adhesive sets, to permanently retain the stop member 28 within the second bottom end of the cutter housing 4 so that those components become integral with one another. Preferably the stop member 28 is threaded into the second bottom end of the cutter housing 4 such that a second bottom end of the stop member 28 is at least flush with the second bottom end surface of the cutter housing 4 or the stop member 28 is slightly recessed within the cutter housing 4.

A feed member 34 is then inserted into the opposite first open end of the cutter housing 4 and accommodated therein such that an annular flange 38 of the leading first end of the feed member 34 abuts against a second end of the stop member 28. A cylindrical bushing 36 of the feed member 34 passes partially through a central aperture 29, formed in the stop member 28, while the annular flange 38 of the feed member 34 abuts against the stop member 28 and prevents the feed member 34 from passing completely through the stop member 28, i.e., the annular flange 38 engages with the second end surface of the stop member 28 and such engagement forms a bearing surface, the purpose of which will become apparent from the following description. A leading end of the first end of the feed member 34 extends completely through the central aperture 29 of the stop member 28 and engages with a drive member or gear wheel 40 which facilitates rotation of the feed member 34 in a desired rotational direction, e.g., either a clockwise or counter clockwise rotational direction. An axial length of the bushing 36, excluding the D-shaped head 42, is slightly less than the axial length of the stop member 28 so that only the D-shaped head 42 extends or projects out past the second end of the cutter housing 4 while the bottom surface 41 of the feed member 34 is slightly recessed within the cutter housing 4. An exterior thread 44 is formed along the upper second end of the feed member 34, and the purpose of this exterior thread 44 will become apparent from the following description.

The first end of the feed member 34, which extends or projects through the central aperture 29 of the stop member 28, has the D-shaped head 42—or any other shaped configuration which facilitates securely affixing the gear wheel 40 to the feed member 34—and this D-shaped head 42 is received within and mates with a mating D-shaped opening 46 formed in central region of a gear wheel 40 to lockingly couple the feed member 34 to the gear wheel 40. A central area of the D-shaped head 42 has a threaded bore 48 therein and a threaded fastener 50, e.g., a screw for example, passes through a cup spring 52 and the gear wheel 40 and threadedly engages with the threaded bore 48 in the D-shaped head 42 to connect and secure those components with one another. The connection between the mating D-shaped head 42 and the D-shaped opening 46 ensure that any rotational movement or motion of the gear wheel 40 is directly transferred to the feed member 34.

The annular flange 38 of the feed member 34 also ensures that a bottom surface 41 of the feed member 34 is slightly recessed within the cutter housing 4 so that only the D-shaped head 42 extends out of the cutter housing 4. As a result of this arrangement, once the cup spring 52 and the threaded fastener 50 affix the gear wheel 40 to the feed member 34, the cup spring 52 is generally sufficiently tighten so as to be partially compressed and bias the gear wheel 40 against the second bottom surface of the cutter housing 4. Such biasing of gear wheel 40, against the cutter housing 4 by the cup spring 52, provides a frictional engagement/locking feature which ensures that the gear wheel 40 remains in its rotated position following rotation by the indexing member 84, which rotation will be discussed below in further detail. That is, the cup spring 52 biases the gear wheel 40 against the cutter housing 4 so as to prevent both "over-feeding" or over movement of the gear wheel 40 as well as "back-feeding" or reverse movement of the gear wheel 40 due to the machining forces which are experienced by the bit holder 24 and may possibly be transferred to the feed member 34 and the gear wheel 40.

Alternatively, if so desired, the axial length of the bushing 36, excluding the D-shaped head 42, may be slightly longer than the axial length of the stop member 28 so that a small portion of the leading end of the bushing 36 as well as the D-shaped head 42 both extend or project out past the second end of the cutter housing 4. As a result of such arrangement, once the cup spring 52 and the threaded fastener 50 affix the gear wheel 40 to the feed member 34, the cup spring 52 is generally sufficiently tighten so as to be sufficiently compressed and prevent loosening of the threaded fastener 50. However, since the leading end portion of the bushing 36 extends or projects slightly out past the second end of the cutter housing 4, the gearwheel 40 is spaced slightly away from the second end of the cutter housing 4 and this arrangement avoids the above describe frictional engagement/locking feature between the gearwheel 40 and the second end of the cutter housing 4. Due to such arrangement, the gearwheel 40 is thus able to rotate freely, relative to the cutter housing 4, and this embodiment, which avoids the "drag" associated with the previous embodiment, may be preferred for some applications.

Figure 3:
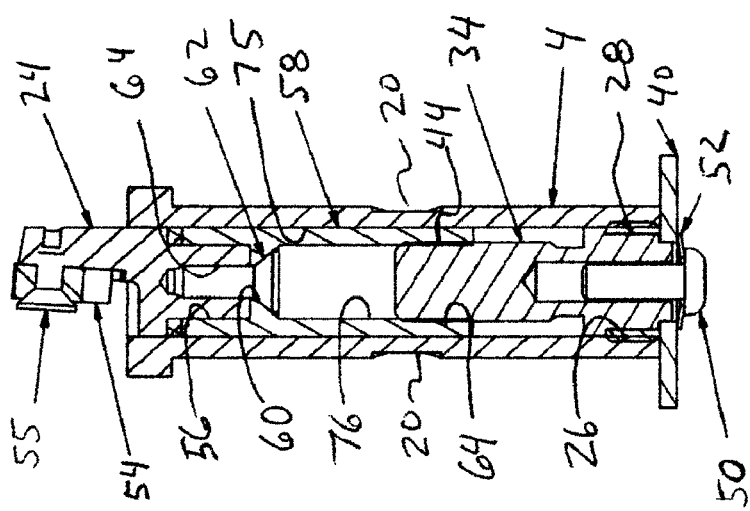
FIG. 3 is a diagrammatic cross sectional view along section line 3-3 of FIG. 2.
Figure 2:
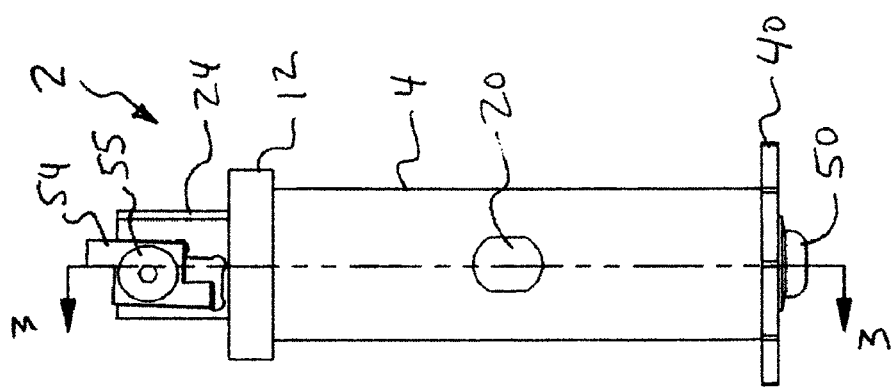
FIG. 2 is a diagrammatic front elevational view of FIG. 1.
Figure 12:
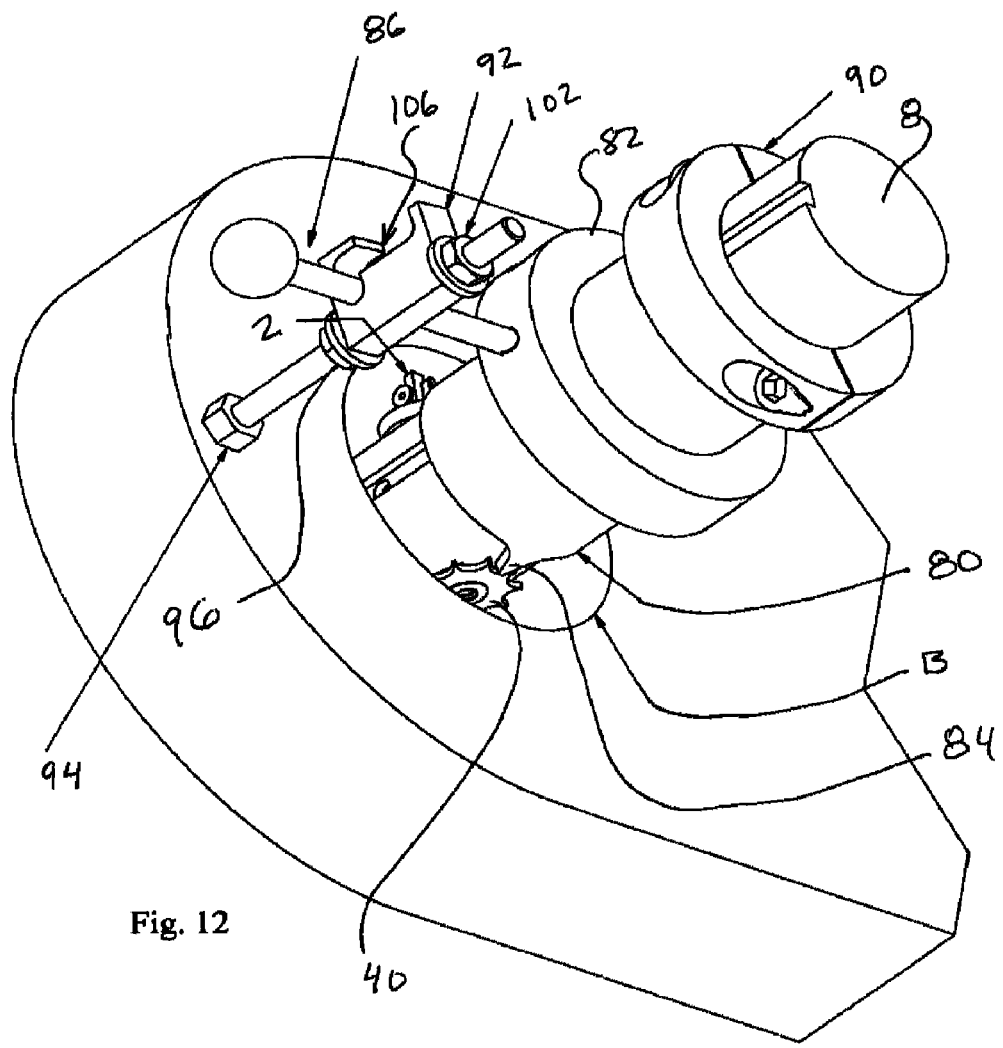
FIG. 12 is a diagrammatic perspective view showing the groove cutting assembly, supported by the boring bar, located within a bore to be repaired following installation of the stop rod.
Figure 13:
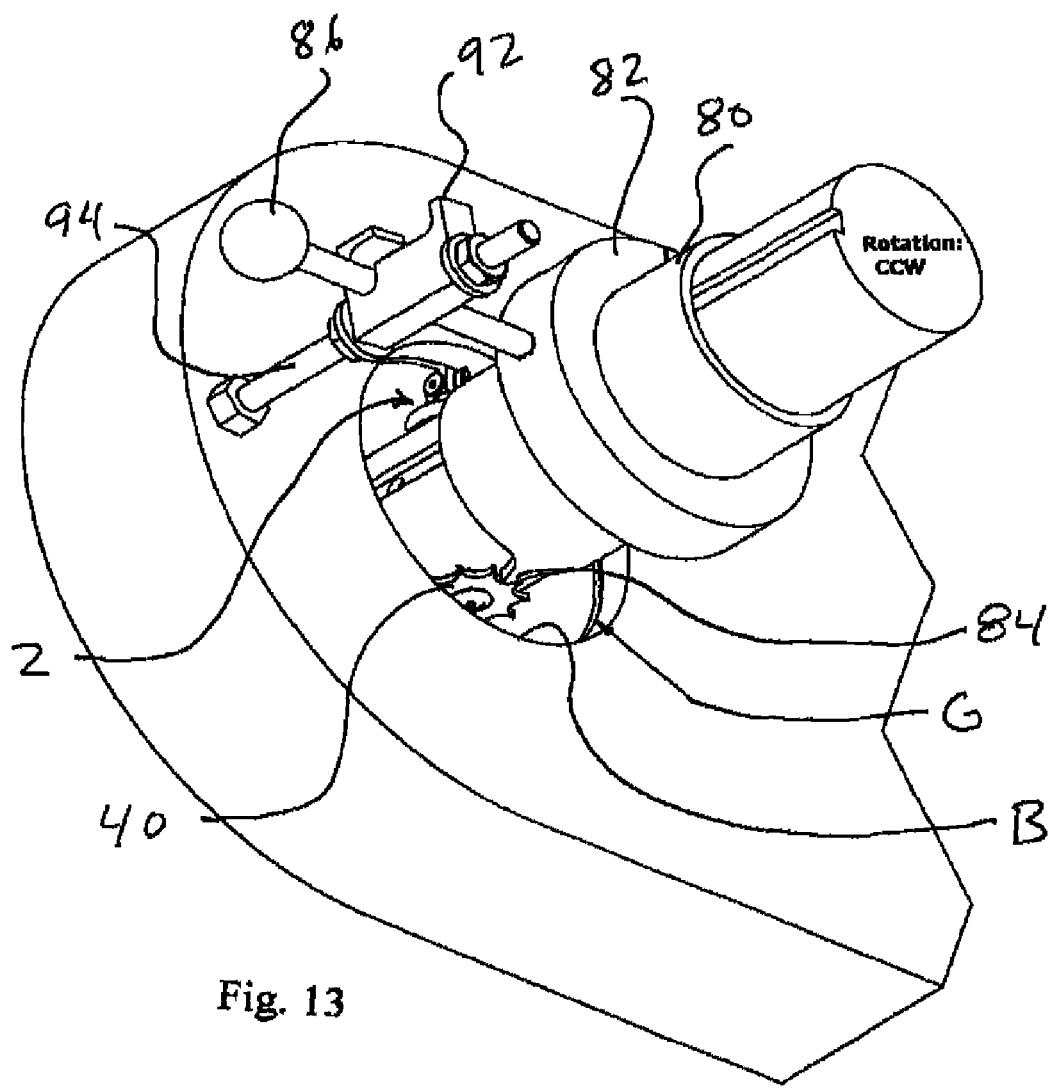
FIG. 13 is a diagrammatic perspective view showing the groove cutting assembly, supported by the boring bar, during formation of an annular groove within the bore being repaired.
Figure 7B:
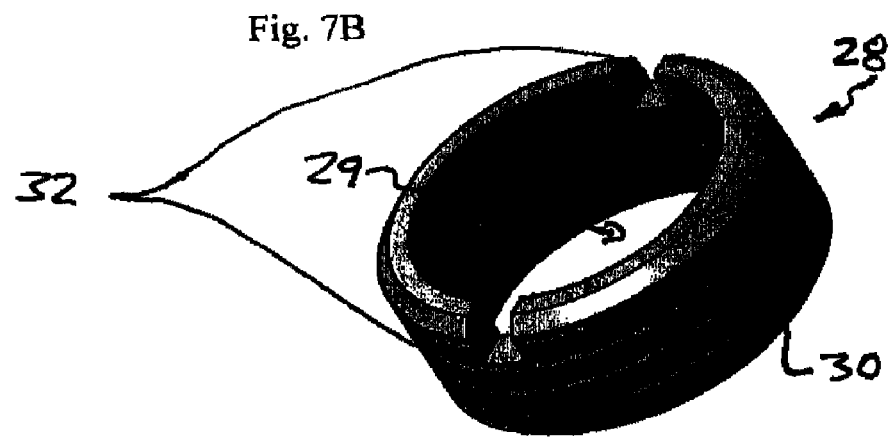
FIG. 7B is a diagrammatic perspective view of a stop member which engages with the cutter housing.
Figure 14:
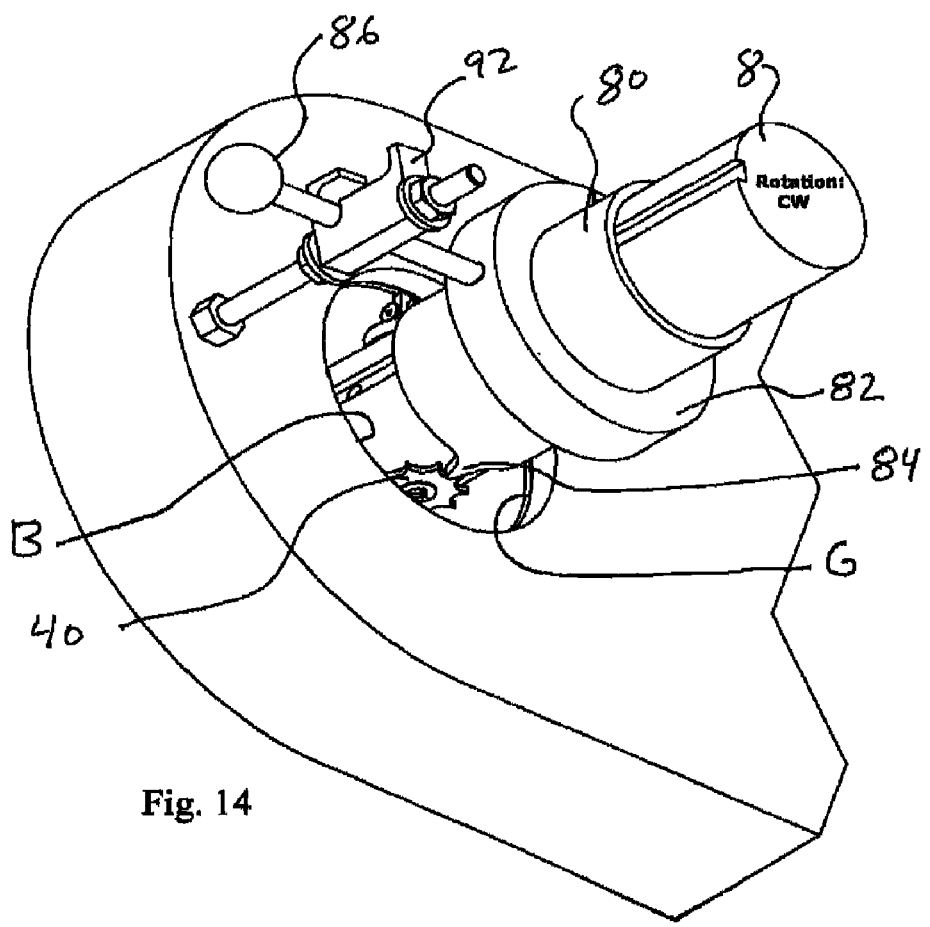
FIG. 14 is a diagrammatic perspective view showing retraction of the groove cutting assembly, supported by the boring bar, following formation of the annular groove within the bore being repaired.

Machining or cutting is achieved, by the grooving cutting assembly 2, via a replaceable groove cutting bit 54 which is releasably supported, via a fastener such as a screw 55 engaging a threaded bore 57 formed in the bit holder 24 to form a cutter assembly. As can be seen in FIG. 3, a lower second end of the bit holder 24 is, in turn, received and supported by a cylindrical cavity 56 formed in an upper first end of a cylindrical barrel assembly 58. An axial bore 60 is formed within the barrel assembly 58 and a threaded fastener 62, which engages with a threaded aperture 64 formed in the lower second end of the bit holder 24, permanently secures and fastens the bit holder 24 to the barrel assembly 58.

An upper ridge of the bit holder 24 has a reinforcing rib 66 (see FIG. 6A), which extends axially away from the bit holder 24 and directly behind the cutting bit 54, to reinforce the replaceable cutting bit 54 during operation of the groove cutting assembly 2 and minimize breakage thereof when the cutting bit 54 is machining a groove G. It is to be appreciated that the reinforcing rib 66 must not be too long or too wide so as to hinder machining of the annular groove G to be formed in a surface for the bore. Preferably the trailing surface of both the bit holder 24 and the reinforcing rib 66 taper so as not to hinder machining of an annular groove G to be formed in a surface.

An exterior surface of the barrel assembly 58 has an elongate longitudinal key way 68 which extends along the entire length thereof and a mating key 70 is located within this key way 68. This mating key 70 is also sized to mate with the longitudinal key way 18 provided in the interior surface of the cutter housing 4 so that the key 70 prevents relative rotation between the barrel assembly 58 and the cutter housing 4, during operation of the groove cutting assembly 2, but permits the barrel assembly 58 to move or slide relative to the cutter housing 4. The key 70 is slightly longer than the barrel assembly 58 such that one end of the key 70 extends radially past an upper first surface of the barrel assembly 58 to form an alignment protrusion 72 while a lower surface of the bit holder 24 has a mating alignment recess 74 (see FIG. 6A). The alignment protrusion 72, of the key 70, and the alignment recess 74 mate with one another and prevent rotation of the bit holder 24, within the cylindrical cavity 56, relative to the barrel assembly 58 during use of the groove cutting assembly 2.

The exterior surface of the barrel assembly 58 has a slight clearance, e.g., a clearance of between about 0.0005 to about 0.003 thousands of an inch or so and more preferably a clearance of about 0.001 thousands of an inch with the inwardly facing cylindrical surface 75 of the cutter housing 4. An interior thread 76 is formed along a portion length of the interior surface of the barrel assembly 58, adjacent the first end thereof, and this thread 76 is sized to matingly engage with the exterior thread 44 formed along the upper second end of the feed member 34. Preferably both threaded elements have a thread pitch of between about 20 and about 100, and more preferably have a 48 pitch thread. As a result of this arrangement, as the gear wheel 40 rotates in a desired rotational direction, i.e., in either a clockwise or a counterclockwise rotational direction, such rotation, in turn, incrementally drives the feed member 34 in the same rotational direction by about 36 degrees (±18 degrees) or so, as will be described below in further detail. It is to be appreciated that either a coarser or a finer thread pitch can be utilized, depending upon the particular application, and such coarser or finer thread will index the bit holder 24 radially either a greater distance or a lesser distance relative to the cutter housing 4.

As shown in FIGS. 1 and 8 of the drawings, the gearwheel 40 has a total of the ten teeth 78 and each tooth 78 is located about 36 degrees or so from each pair of adjacent teeth 78. It is to be appreciated that if the gear wheel 40 has a greater number of teeth, then each tooth 78 will be located less than 36 degrees apart from each pair of adjacent teeth and the feed member 34 will thus be driven a smaller incrementally distance each time the gear wheel 40 is rotated by the indexing member 84 (for example fifteen teeth 78 with each tooth 78 being located about 24 degrees or so apart from each pair of adjacent teeth 78). Conversely, if the gear wheel 40 has a lesser number of teeth 78, then each tooth will be located greater than 36 degrees apart from each pair of adjacent teeth and the feed member 34 will be driven a greater incrementally distance each time the gear wheel 40 is rotated by the indexing member 84. Typically, the gear wheel 40 has between 6 and 20 teeth 78.

Since the barrel assembly 58 is unable to rotate relative to the cutter housing 4, due to the key 70 mating with the pair of key ways 18, 68, any rotation of the feed member 34, relative to the barrel assembly 58, causes the barrel assembly 58 to gradually move either radially toward or away from the feed member 34 and thus move either radially outwardly or radially inwardly within the bore of the cutter housing 4, depending upon the rotational direction of the feed member 34 and the gear wheel 40. As a result of this, the cutting bit 54, supported by the bit holder 24 and the barrel assembly 58, is, in turn, either indexed radially outwardly or radially inwardly, depending upon the degree and the rotational direction of the gear wheel 40.

The barrel assembly 58, which supports the bit holder 24, and a feed member 34, which is lockingly coupled to the drive member or gear wheel 40, generally comprises a drive mechanism for the groove cutting assembly 2. The feed member 34 threadedly engages the barrel assembly 58 so that rotation of the drive member or gear wheel 40 and the feed member 34, in a first rotational direction, indexes the bit holder 24 radially outwardly away from the cutter housing 4, while rotation of the gear wheel 40 and the feed member 34, in the opposite rotational direction, indexes the bit head 24 radially inwardly toward the cutter housing 4.

It is to be appreciated that depending upon the thread pitch, each partial rotation, e.g., 1/10 of a rotation or 36 degrees of rotation, for example, of the gear wheel 40 will cause a desired radially indexing, e.g., between 0.0005 thousands of an inch to 0.010 thousands of an inch, for example, of the cutting bit 54, the bit holder 24 and the barrel assembly 58 with respect to the feed member 34 and the cutter housing 4. Accordingly, the size of the gear wheel 40, as well as the amount of teeth 78 contained on the gearwheel 40, will determine how many complete rotations of the boring bar 8 are required in order to achieve one complete rotation of the feed member 34 with respect to the barrel assembly 58.

With reference now to FIGS. 9-14, a detailed description concerning set up of the groove cutting assembly 2, with respect to a boring bar 8 for example, will now be described in detail. With reference to FIG. 9, the boring bar 8 is shown prior to any assembly and prior to receiving the groove cutting assembly 2. A rotational sleeve 80 is first accommodated by and surrounds an exterior surface of the boring bar 8 and a stop rod clamp 82 is then clamped about an central region of the rotational sleeve 80 (see FIGS. 10 and 11). The inwardly facing surface of the rotational sleeve 80 has a slight clearance, e.g., a clearance of between about 0.001 to about 0.010 thousands of an inch or so, for example, with the exterior surface of the boring bar 8. A leading end of the rotational sleeve 80 has an indexing member 84 which interacts with the gear wheel 40 to facilitate desired driving or indexing of the groove cutting assembly 2 during operation of the boring bar 8, as will be described below in further detail. That is, the indexing member 84, as can be seen in FIG. 9A, is shaped and sized to fit between a pair of teeth of the gear wheel 40. A stop rod 86 threadedly engages with a threaded aperture 85 provided in the stop rod clamp 82 and a further description concerning the purpose of the stop rod 86 will follow below. A C-shaped spacer 88 is located between a trailing end of the rotational sleeve 80 and a position clamp 90, e.g., the position clamp 90 prevents further rearward movement of the rotational sleeve 80 along the boring bar 8 following installation and during rotation of the boring bar 8 while maintaining the indexing member 84 in a correct position for interacting with the gear wheel 40.

As can be seen in FIGS. 10 and 11, the groove cutting assembly 2 is shown accommodated within the tool holder 6 of the boring bar 8. Following insertion of the groove cutting assembly 2 into the tool holder 6 of the boring bar 8, a set screw 22, located within a threaded aperture of the boring bar 8, is tightened against a desired one of the set screw flats 20 formed in the exterior surface of the cutter housing 4 to retain the groove cutting assembly 2 within the tool holder 6. Thereafter, the rotational sleeve 80 is slid toward the groove cutting assembly 2 and located such that the indexing member 84 of the rotational sleeve 80 is accommodated between two adjacent teeth 78 of the gear wheel 40 (see FIG. 10), e.g., the indexing member 84 is located within a trough between two adjacent teeth 78. Once this position is achieved, the C-shaped spacer 88 is biased into abutting engagement against a trailing end of the rotational sleeve 80 and then the position clamp 90 is biased into abutting engagement with the spacer 88. The position clamp 90 is then securely tightened in place to the boring bar 8 and, following securing of the position clamp 90, the spacer 88 is then removed from its position between the remote end of the rotational sleeve 80 and the position clamp 90. As a result of this set up, the rotational sleeve 80 is then correctly positioned with a slight clearance so that each rotation of the boring bar 8 causes the gear wheel 40 to engage and be indexed, by the indexing member 84 of the rotational sleeve 80 by one tooth 78, thereby causing the cutting bit 54 to be indexed either radially inwardly or radially outwardly, depending upon the rotational direction of the boring bar 8.

To prevent rotation of the rotational sleeve 80 relative to the boring bar 8, while the groove cutting assembly 2 and the boring bar 8 both rotate, the stop rod 86 is supported by a retainer 92 (see FIGS. 9, 9B and 12-14). To facilitate temporary support of the retainer 92, either a bolt or an elongate nut is "tack welded" to an exterior surface of the component containing the bore B being repaired. As can be seen in FIG. 9, if a nut is welded, then a first end of a threaded rod engages with this tack welded nut while a second opposite end of the threaded rod or the bolt 94 then engages with a first nut 96 and first washer 98 and the second opposite end of the threaded rod or the bolt 94 then passes completely through a through bore 100 formed in the retainer 92. A second nut 102 and a second washer 104 then engage the second opposite end of the threaded rod or the bolt 94 and are sufficiently tightened to clamp the retainer 92 between the first and the second pair of nuts 96, 102. The stop rod 86 is then captively received within the J-shaped slot 106 of the retainer 92 and such captive retainment secures the rotational sleeve 80 and prevents rotation of the rotational sleeve 80 as the boring bar 8 and the groove cutting assembly 2 both rotate during machining of a groove G to be formed. This arrangement ensures that the indexing member 84 will remain in a fixed position, relative to the bore B being repaired, and thereby be positioned to rotate the gear wheel 40, by one tooth 78, each time the boring bar 8 rotates the gear wheel 40 past the indexing member 84 of the rotational sleeve 80.

The retainer 92 is designed so that when the operator determines that the annular groove G has been adequately formed in the surface of the bore B being repaired, the operator can then stop rotation of the boring bar 8 and/or move the rotational sleeve 80 out of engagement with the rotating gear wheel 40. Upon discontinuing rotation of the boring bar 8, the operator can then rotate the gear wheel 40 in a direction opposite to the feed direction of the groove cutting assembly 2, by using his or her finger(s), to retract the cutting bit 54 a small distance out of the groove G which was just machined. Typically rotation of the gear wheel 40 by only a quarter to a half a turn or so is adequate to sufficiently space the cutting bit 54 away from a bottom surface of the groove G being machined.

Once the cutting bit 54 is sufficiently spaced away from the bottom surface of the groove G just machined, the operator then ensures that the stop rod 86 is captively retained by the retainer 92 and reverses the rotational direction of the boring bar 8. As the groove cutting assembly 2 is rotated in the opposite rotational direction, the cutting bit 54 is gradually indexed radially inward by the same indexing distance, e.g, between 0.0005 thousands of an inch to 0.010 thousands of an inch, each time the gearwheel 40 of the groove cutting assembly 2 is rotated by the index member 84 as the groove cutting assembly 2 rotates past the indexing member 84. Once the groove cutting assembly 2 is sufficiently retracted from the annular groove G being machined, rotation of the boring bar 8 is then discontinued. Once this occurs, the operator can then either form another annular groove G in the bore B being repaired or disassemble the groove cutting assembly 2 by generally reversing the above described procedure.

In order to determine a machining depth of the groove G to be machined in the bore B being repaired, the thread pitch and the number of teeth 78 carried by the gear wheel 40 must be known. For example, assuming that an annular groove G, having a depth of 50 thousandths of an inch, is to be machined in a surface of the bore B being repair and assuming that the groove cutting assembly 2 indexes radially outwardly and inwardly a distance of 2 thousands of an inch each time the gearwheel 40 is indexed as the gearwheel 40 engages with the index member 84, then the operator will merely have to count 25 rotations of the gear wheel 40, of the groove cutting assembly 2, rotating past the indexing member 84 (i.e., 25 times 0.002 of an inch=0.050 of an inch), and the operator will be certain that the formed annular groove G has a desired depth of 50 thousands. If, as discussed above, a greater or lesser degree of radially movement or indexing is desired or required, then a gear wheel 40 having a smaller number of teeth 78 or a larger number of teeth 78 can be used and/or the mating threads of the feed member 34 and the barrel assembly 58 can be either coarser or finer.

With reference now to FIGS. 15-18, an alternative arrangement of the groove cutting assembly according to the present invention will now be described. As this arrangement is similar to the previous embodiment, a detail discussion will only be provided with respect to the different features of this arrangement.

According to this alternative arrangement, the groove cutting portion of the tool has a cutting edge or surface 54', which facilitates machining or cutting of the surface, formed integral a bit holder 24 to form a cutter assembly 24' and such arrangement eliminates the need for the fastener, such as a screw, for securing the groove cutting bit to the bit holder, as with the previous embodiment. In addition, the cutter assembly 24' is, in turn, formed integral with an upper first end of a cylindrical barrel assembly 58' to form a groove cutter and barrel assembly 60'. This arrangement eliminates the need for a threaded fastener, such as a screw, for fastening the bit holder to the barrel assembly, as with the previous embodiment.

Similar to the previous embodiment, a reinforcing rib 66 is provided directly behind the cutting edge or surface 54' for reinforcement thereof during operation of the groove cutting assembly 2 as well as to minimize breakage thereof while machining a groove G. It is to be appreciated that the reinforcing rib 66 must not be too long or too wide so as to hinder machining of the annular groove G to be formed in a surface for the bore. Preferably a trailing surface of the reinforcing rib 66 tapers so as not to hinder machining of the annular groove G to be formed in a surface.

As with the previous embodiment, an exterior surface of the barrel assembly 58' has an elongate longitudinal key way 68 which extends along the entire length thereof and a mating key 70 is accommodated within this key way 68. This mating key 70 is also sized to mate with the longitudinal key way 18 provided in the interior surface of the cutter housing 4 so that the key 70 prevents relative rotation between the groove cutter and barrel assembly 60' and the cutter housing 4, during operation of the groove cutting assembly 2, but permits the groove cutter and barrel assembly 60' to move or slide relative to the cutter housing 4. Since the cutter assembly 24' is integral with the cylindrical barrel assembly 58', such integration prevents rotation of the cutting edge or surface 54' relative to a remainder of the groove cutter and barrel assembly 60' during use of the groove cutting assembly 2.

The exterior surface of the barrel assembly 58' of the groove cutter and barrel assembly 60' has a slight clearance, e.g., a clearance of between about 0.0005 to about 0.003 thousands of an inch or so and more preferably a clearance of about 0.001 thousands of an inch, with the inwardly facing cylindrical surface 75 of the cutter housing 4. An interior thread 76' is formed along a portion of the length of the interior surface of the groove cutter and barrel assembly 60', adjacent the first end thereof, and this thread 76' is sized to matingly engage with the exterior thread 44 formed along the upper second end of the feed member 34. Preferably both threaded elements have a thread pitch of between about 20 and about 100, and more preferably have a 48 pitch thread. As a result of this arrangement, as the gear wheel 40 rotates in a desired rotational direction, i.e., in either a clockwise or a counterclockwise rotational direction, such rotation, in turn, incrementally drives the feed member 34 in the same rotational direction by about 36 degrees or so. It is to be appreciated that either a coarser or a finer thread pitch can be utilized, depending upon the particular application, and such coarser or finer thread will index the groove cutter and barrel assembly 60' radially either a greater distance or a lesser distance relative to the cutter housing 4.

Similar to the previous embodiment, as the groove cutter and barrel assembly 60' is unable to rotate relative to the cutter housing 4, due to the key 70 mating with the pair of key ways 18, 68, any rotation of the feed member 34, relative to the groove cutter and barrel assembly 60', causes the groove cutter and barrel assembly 60' to gradually move radially either toward or away from the feed member 34 and thus move either radially outwardly or radially inwardly within the bore of the cutter housing 4, depending upon the rotational direction of the feed member 34 and the gear wheel 40. As a result of this, the groove cutter and barrel assembly 60' as well as its cutting edge or surface 54' is, in turn, either indexed radially outwardly or radially inwardly, depending upon the degree and the rotational direction of the gear wheel 40.

It is to be appreciated that although this alternative arrangement is somewhat more expensive to manufacture, there are fewer components and this tends to render this arrangement more efficient to use on site. In particular, when the cutting edge or surface 54' breaks or is otherwise damaged, the entire groove cutter and barrel assembly 60' is removed and replaced with a new groove cutter and barrel assembly 60'.

Preferably at least the cutting edge or surface 54' of the cutter assembly 24 is manufactured from a relatively hard material, such as high speed steel. Moreover, in the event that the cutting edge or surface 54' becomes dull for some reason, then this cutting edge or surface 54' can be removed, resharpened and then reinstalled for further machining. It is to be appreciated that the cutter assembly 24, alternatively, could be manufactured from non-hardened steel, for example, and have a carbide bit silver soldered thereto to form the cutting edge or surface 54'.

Within the spirit and scope of the invention, it is to be appreciated that the cutter assembly could be manufactured as a completely separate assembly, as depicted in FIG. 19, and this cutter assembly 24" could thereafter be attached, via a threaded fastener such as a screw 62, to the barrel assembly 58' similar to the first embodiment. This embodiment is also somewhat more expensive to manufacture since there are fewer components than the first embodiment. According to this embodiment, when the cutting edge or surface 54' chips, breaks or is otherwise damaged, only the cutter assembly 24" is removed from the barrel assembly 58' for resharpening and/or replacement with a new cutter assembly 24" which is affixed to the barrel assembly 58' to form a groove cutter and barrel assembly 60'.

Since certain changes may be made in the above described the groove cutting assembly, without departing from the spirit and scope of the invention herein involved, it is intended that all of the subject matter of the above description or shown in the accompanying drawings shall be interpreted merely as examples illustrating the inventive concept herein and shall not be construed as limiting the invention.

What is claimed is:

1. A groove cutting assembly defining a longitudinal axis and comprising:
    a cutter housing defining a longitudinal through bore which extends along the longitudinal axis;
    a cutter assembly have a cutting edge, and the cutter assembly being accommodated by the cutter housing and being movable along the longitudinal through bore; and
    a drive mechanism, coupled to the cutter assembly, for automatically indexing the cutter assembly one of radially inward and radially outward, relative to the cutter housing and along the longitudinal through bore, upon rotation of the cutter assembly past an indexing member.

2. The groove cutting assembly according to claim 1, wherein the drive mechanism comprises a barrel assembly, engaged with the cutter assembly, and a feed member which threadedly engages with the barrel assembly so that rotation of the feed member, in a first rotational direction, indexes the cutter assembly radially outwardly away from the cutter housing, while rotation of the feed member, in an opposite rotational direction, indexes the cutter assembly radially inwardly toward the cutter housing.

3. The groove cutting assembly according to claim 2, wherein the feed member has an exterior thread and the barrel assembly has an interior thread which facilitate indexing the barrel assembly relative to the feed member, while the barrel assembly is prevented from rotating relative to the cutter housing but allowed to slide axially relative thereto.

4. The groove cutting assembly according to claim 3, wherein an inwardly facing surface of the cutter housing is provided with a first key way and an exterior surface of the barrel assembly is provided with a mating second key way and a key is accommodated in the first and second key ways to prevent relative rotation between the barrel assembly and the cutter housing but allow sliding movement therebetween.

5. The groove cutting assembly according to claim 2, wherein a stop member, which has a central aperture, is fastened to a first end of the cutter housing and a first end of the feed member passes through the central aperture of the stop member and an annular flange, of the feed member, abuts against the stop member to rotationally support the feed member within the cutter housing, and the annular flange and the stop member form a bearing surface which facilitates rotation of the feed member relative to the cutter housing.

6. The groove cutting assembly according to claim 2, further comprising a gear wheel wherein the feed member has a shaped protrusion and the gear wheel has a mating shaped aperture which facilitates lockingly coupling of a gear wheel to the feed member while preventing relative rotation therebetween.

7. The groove cutting assembly according to claim 1, wherein the cutter housing has a pair of opposed set screw flats, formed in an exterior surface thereof, which facilitates orientating the groove cutting assembly in a desired machining direction.

8. The groove cutting assembly according to claim 2, wherein the cutter assembly is one of formed integrally with and separate from the barrel assembly.

9. The groove cutting assembly according to claim 6, wherein the feed member has a D-shaped head and the gear wheel has a mating D-shaped aperture which facilitates locking coupling of the gear wheel to the feed member while preventing relative rotation therebetween.

10. The groove cutting assembly according to claim 8, wherein a cup spring biases the gear wheel against a surface of the cutter housing to provide a locking feature which ensures that the gear wheel remains in its rotated position following rotation by the indexing member.

11. A groove machining combination comprising:
    a groove cutting assembly;
    a boring bar, the boring bar having at least one tool holder and a set screw is provided for securing the groove cutting assembly within the tool holder;
    a stationary indexing member; and
    the groove cutting assembly comprising:
        a cutter housing;
        a cutter assembly have a cutting edge, and the cutter assembly being accommodated by the cutter housing; and
        a drive mechanism, coupled to the cutter assembly, for indexing the cutter assembly one of radially inward and radially outward relative to the cutter housing upon rotation of the cutter assembly past an indexing member.

12. The groove machining combination according to claim 11, wherein the drive mechanism comprises a barrel assembly, engaged with the cutter assembly, and a feed member which threadedly engages with the barrel assembly so that rotation of the feed member, in a first rotational direction, indexes the cutter assembly radially outwardly away from the cutter housing, while rotation of the feed member, in an opposite rotational direction, indexes the cutter assembly radially inwardly toward the cutter housing.

13. The groove machining combination according to claim 12, wherein the feed member has an exterior thread and the barrel assembly has an interior thread which facilitate indexing the barrel assembly relative to the feed member, while the barrel assembly is prevented from rotating relative to the cutter housing but allowed to slide axially relative thereto.

14. The groove machining combination according to claim 13, wherein an inwardly facing surface of the cutter housing is provided with a first key way and an exterior surface of the barrel assembly is provided with a mating second key way and a key is accommodated by the first and the second key ways to prevent relative rotation between the barrel assembly and the cutter housing but allow sliding movement therebetween.

15. The groove machining combination according to claim 11, wherein a rotational sleeve is supported by the boring bar, and the rotational sleeve has the stationary indexing member, and a retainer prevents rotation of the rotational sleeve and the indexing member during rotation of the boring bar.

16. The groove machining combination according to claim 15, wherein a position clamp is clamped to the rotational sleeve, and a stop rod is connected to the position clamp and engages with the retainer to prevent rotation of the indexing member as the boring bar rotates.

17. The groove machining combination according to claim 16, wherein a threaded member is secured adjacent a bore to be repaired and the retainer is supported by the retainer.

18. The groove machining combination according to claim 14, further comprising a gear wheel, wherein a stop member, which has a central aperture, is fastened to a first end of the cutter housing and a first end of the feed member passes through the central aperture of the stop member and an annular flange, of the feed member, abuts against the stop member to rotationally support the feed member within the cutter housing, and the annular flange and the stop member form a bearing surface which facilitates rotation of the feed member relative to the cutter housing;

feed member has a shaped protrusion and the gear wheel has a mating shaped aperture which facilitates lockingly coupling of the gear wheel to the feed member while preventing relative rotation therebetween; and the cutter housing has a pair of opposed set screw flats, formed in an exterior surface thereof, which facilitates orientating the groove cutting assembly in a desired machining direction.

19. The groove machining combination according to claim 14, wherein the feed member has a D-shaped head and the gear wheel has a mating D-shaped aperture which facilitates locking coupling of the gear wheel to the feed member while preventing relative rotation therebetween; and a cup spring biases the gear wheel against a bottom surface of the feed member to facilitate retention of the gear wheel.

20. A method of forming a groove in a surface of a bore being repaired via a groove cutting assembly supported by a tool holder of a boring bar, and a stationary indexing member for indexing the groove cutting assembly, wherein the groove cutting assembly defines a longitudinal axis and comprises a cutter housing defining a longitudinal through bore which extends along the longitudinal axis, a cutter assembly have a cutting edge, and the cutter assembly being accommodated by the cutter housing and movable along the longitudinal through bore, and a drive mechanism, coupled to the cutter assembly, for indexing the cutter assembly one of radially inward and radially outward relative to the cutter housing and along the longitudinal through bore; and the method comprising the steps of:

locating the groove cutting assembly in a bore being repaired:

rotating the boring bar and the groove cutting assembly in a first rotational direction; and indexing, via the stationary indexing member, the groove cutting assembly one of radially inward and radially outward and along the longitudinal through bore each time the groove cutting assembly rotates past the stationary indexing member to machine the groove in the bore being repaired.

* * * * *